UNITED STATES PATENT OFFICE.

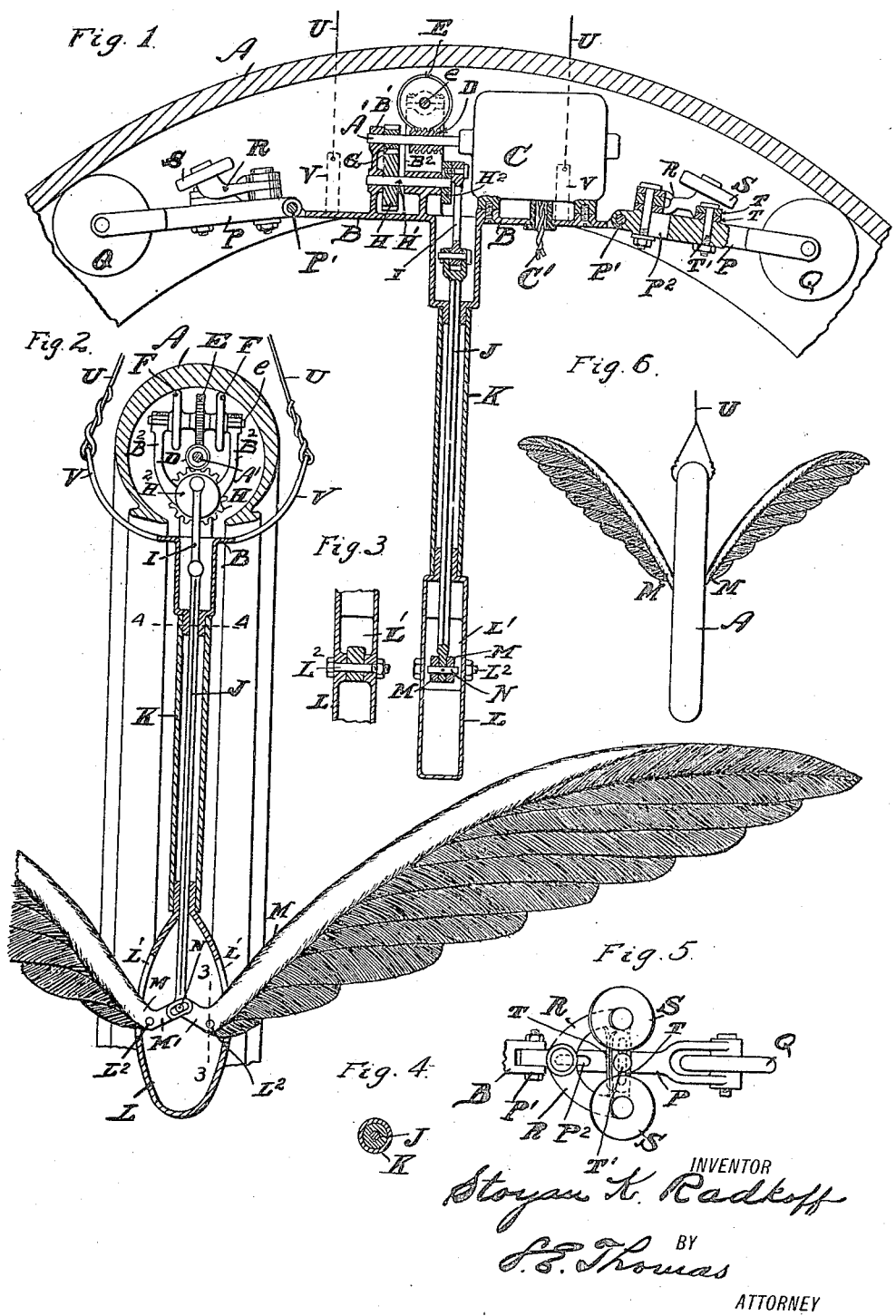

STOYAN K. RADKOFF, OF DETROIT, MICHIGAN.

TIRE-ADVERTISING DEVICE.

1,229,654. Specification of Letters Patent. Patented June 12, 1917.

Application filed December 1, 1916. Serial No. 134,403.

*To all whom it may concern:*

Be it known that I, STOYAN K. RADKOFF, a citizen of the United States, residing at Detroit, county of Wayne, State of Michigan, have invented a certain new and useful Improvement in Tire-Advertising Devices, and declare the following to be a full, clear, and exact description of the same, such as will enable others skilled in the art to which it pertains to make and use the same, reference being had to the accompanying drawings, which form a part of this specification.

My invention relates to advertising devices and is especially designed for displaying automobile or other like tires as shown in the accompanying drawings and more fully described in the following specification and claims.

One of the objects of my invention is to provide a device adapted to receive and support a full size automobile tire or outer casing and to continuously rotate the same by mechanism concealed within the casing, the construction being such that the tire may be suspended from above in a show window, or other point of vantage by wires or other elements.

Another feature of the invention consists in providing wings extending from the center (or hub) on each side of the tire, which are actuated through the mechanism employed to rotate the tire in semblance of a "winged flight" of the tire.

With the foregoing and other objects in view which will appear as the description proceeds, the invention resides in the combination of parts and in the details of construction hereinafter described and claimed, it being understood that changes may be made in the precise embodiment of the invention herein disclosed without departing from the spirit of the invention.

In the accompanying drawings forming part of this specification.

Figure 1 is a longitudinal vertical sectional view of the device with parts in elevation, showing a fragmentary portion of an automobile tire in position.

Fig. 2 is a vertical cross-sectional view of the device shown in the preceding figure.

Fig. 3 is a sectional view on line 3—3 of Fig. 2 of a detail of construction.

Fig. 4 is a cross-sectional view on line 4—4 of Fig. 2.

Fig. 5 is a plan view of a fragmentary detail, showing the horizontal idlers or rolls employed to take up lateral displacement of the tire when rotating.

Fig. 6 is an end elevation of the suspended tire, showing the extended wings of the device as in flight.

Referring now to the letters of reference placed upon the drawings.

A, denotes an automobile tire. B, indicates a suitable frame work partially concealed within the tire, on which is mounted an electric motor C.

C', is an electric service cord leading to the motor. A', indicates the armature shaft of the motor its outer end being journaled in the bearing B', rising from the frame B. D, designates a driving worm gear carried by the shaft A', in mesh with a worm gear E, the shaft $e$, of which is journaled in a yoke $B^2$, also supported by the frame. F, F, indicate traction wheels carried by the shaft $e$, upon which the tire A, rests and by means of which it is rotated, as will be hereafter explained. G, denotes a pinion mounted on the shaft A', in mesh with a gear H, below, carried by a shaft H', journaled in the frame.

$H^2$, is a disk or crank arm keyed to the shaft H', and I, is a pitman pivoted thereto and to the depending reciprocating rod J, housed within a tube K, extending downwardly from the frame. The rod J, is squared in cross section (see Figs. 3 and 4) and travels through squared apertures in guides carried by the tube. L, is a suitable fitting at the lower end of the tube slotted at L', to admit the projecting members M, M, representing wings, pivoted at $L^2$, to the fitting. The members M, M, have right angle extensions M', slotted to receive a transverse pin N, carried by the end of the rod J.

Projecting from each end of the frame B, within the tire casing (see Fig. 1) is an arm P, pivoted at P', to the frame, its outer end having a yoke shaped formation in which is journaled an idler Q, adapted to assist in supporting the tire.

Pivoted through a slot $P^2$, in the arm P, are two adjustable arms R, carrying idler rolls S, adapted to bear against the side walls of the tire to prevent lateral displacement. T, T, are transverse slotted arms respectively connected with the adjustable arms R;—and T', is a bolt projecting through the slotted arms T, and into the arm P, to secure the rolls S, when properly adjusted in engaging relation with the side walls of the tire. U, are supporting wires attached to arms V, projecting from the sides of the frame for suspending the device from a suitable support.

Having indicated the several parts by reference letters the construction and operation of the device will be readily understood:

The device having been suspended by means of the wires U, from a suitable support, the tire is placed in position with the driving traction wheels F, F, in contact with the inner wall of the tire. The idlers Q, Q, are then adjusted to conform to the diameter of the tire by the regulation of the pivotal bolts at P', P'. The lateral idlers S, S, are then spread apart by the adjustment of the arms on which they are mounted so that any tendency for lateral play of the tire casing is eliminated.

Electric current from a suitable source of supply having been delivered through the service cord C', the motor is energized thereby driving the train of gears controlling the operation of the traction wheels F, upon which the tire rests. The tire is thus caused to rotate, the respective idlers Q, Q, serving to support it, while the idler rolls S, S, keep the tire from accidental lateral displacement. Simultaneous with the rotation of the tire, the projecting members or wings M, M, are actuated through the reciprocating action of the rod J, (to which they are pivoted) through the pitman connection I, with the crank arm carried by the shaft H', in turn driven by the train of gears between it and the armature shaft of the motor.

It will thus be seen that the tire will revolve and the wings will operate simulating a winged flight thus producing a very novel and interesting effect.

Having thus described my invention what I claim is:—

1. In a device of the character described, in combination with a tire casing, a frame, a motor supported by the frame, a traction roll journaled in the frame against which the tire casing bears, and means driven by said motor for actuating the traction wheel, whereby the tire casing may be rotated around the motor.

2. In a device of the character described, in combination with a tire casing, a frame, a motor supported by the frame and concealed within the tire casing, traction rolls journaled in the frame upon which the tire is adapted to bear, and a train of gears driven by said motor adapted to actuate said traction wheels, whereby the tire casing may be rotated.

3. In a device of the character described, in combination with a tire casing, a frame, a motor supported by the frame within the casing, traction wheels journaled in the frame upon which the tire casing rests, means driven by the motor for actuating the traction wheels, whereby the tire casing is rotated, a pair of adjustable arms pivoted to the frame, and idlers journaled in the adjustable arms, adapted to assist in supporting the tire casing.

4. In a device of the character described, in combination with a tire casing, a frame, a motor supported by the frame, traction wheels journaled in the frame and driven by the motor, whereby the tire casing may be rotated, a pair of swinging arms pivoted to the frame, idlers journaled in the swinging arms adapted to assist in supporting the tire casing, laterally adjustable arms pivoted to the frame, and idlers journaled in the laterally adjustable arms adapted to bear against the side walls of the tire casing, whereby lateral movement of the tire casing is prevented.

5. In a device of the character described, in combination with a tire casing, a frame, a motor supported by the frame, traction wheels journaled in the frame upon which the tire bears, means driven by the motor for actuating the traction wheels, whereby the tire is rotated, a reciprocating rod, means for guiding said rod, means driven by the motor for actuating the rod, swinging elements pivoted in the frame, and means connecting said rod with the swinging elements, to actuate the latter through the operation of the reciprocating rod.

6. In combination with a tire casing, a device of the character described, comprising a frame, a motor supported by the frame, means actuated by the motor for rotating the tire casing around the motor, a pair of swinging arms pivoted in the frame, and means actuated by said motor for operating the swinging arms.

7. In combination with a tire casing, a device of the character described, comprising a frame, a motor supported by the frame concealed by the tire casing, means driven by the motor for rotating the tire casing around said motor, a pair of swinging arms representing wings pivoted in the frame, means adapted to swing said wings actuated by the motor, and means for suspending said device and tire casing in mid-air.

In testimony whereof, I sign this specification in the presence of two witnesses.

STOYAN K. RADKOFF.

Witnesses:
S. E. THOMAS,
N. HURLEY.

Copies of this patent may be obtained for five cents each, by addressing the "Commissioner of Patents, Washington, D. C."